(12) United States Patent
West et al.

(10) Patent No.: US 9,170,031 B2
(45) Date of Patent: *Oct. 27, 2015

(54) ENERGY TRANSFER MODULE UTILIZING THERMAL POWER GENERATED BY SOLAR PANELS

(75) Inventors: Brian West, Oakland, CA (US); Charles Wade Albritton, Hercules, CA (US)

(73) Assignee: SunEdison, Inc., Maryland Heights, MO (US)

(*) Notice: Subject to any disclaimer, the term of this patent is extended or adjusted under 35 U.S.C. 154(b) by 1063 days.

This patent is subject to a terminal disclaimer.

(21) Appl. No.: 12/952,095

(22) Filed: Nov. 22, 2010

(65) Prior Publication Data

US 2011/0120528 A1    May 26, 2011

Related U.S. Application Data

(60) Provisional application No. 61/263,798, filed on Nov. 23, 2009.

(51) Int. Cl.
| | |
|---|---|
| *F24F 11/00* | (2006.01) |
| *F24J 2/04* | (2006.01) |
| *F24J 2/30* | (2006.01) |
| *F24F 5/00* | (2006.01) |
| *H02S 40/44* | (2014.01) |

(52) U.S. Cl.
CPC .............. *F24J 2/30* (2013.01); *F24F 5/0096* (2013.01); *F24J 2/045* (2013.01); *H02S 40/44* (2014.12); *F24F 2005/0064* (2013.01); *F24F 2005/0067* (2013.01); *Y02B 10/12* (2013.01); *Y02B 10/20* (2013.01); *Y02B 10/70* (2013.01); *Y02E 10/44* (2013.01); *Y02E 10/60* (2013.01)

(58) Field of Classification Search
CPC .................................. H01L 31/058; F24J 2/04
USPC ........................ 126/600, 429, 431; 454/229
See application file for complete search history.

(56) References Cited

U.S. PATENT DOCUMENTS

| | | | |
|---|---|---|---|
| 3,583,175 A | 6/1971 | Eubank | |
| 4,662,562 A | 5/1987 | van Vliet | |
| 4,676,272 A | 6/1987 | Jackson | |
| 4,790,477 A * | 12/1988 | Forkin et al. | 237/2 B |
| 4,967,729 A * | 11/1990 | Okumura | 126/632 |

(Continued)

*Primary Examiner* — Gregory Huson
*Assistant Examiner* — Nikhil Mashruwala
(74) *Attorney, Agent, or Firm* — Armstrong Teasdale LLP

(57) ABSTRACT

An energy transfer module coupled to a thermal solar module includes a body having a first end member, a second end member, and four side members configured to enclose a first spatial region within a vicinity of the first end member and a second spatial region within a vicinity of the second end member. The first spatial region is in communication with the second spatial region. The module further includes one or more inlet openings provided at the first end member for inputting fluid flow from the thermal solar module. The module also includes an air filter disposed within the first spatial region to remove one or more impurities from the fluid flow. Additionally, the module includes a fan disposed between the first spatial region and the second spatial region to draw the fluid flow through the air filter. The fan is coupled to a drive motor. The module further includes a heat exchanger disposed in the first spatial region and an outlet provided on the second end member. Furthermore, the module includes an electrical source coupled to the fan. The electrical source is configured to power the drive motor to draw fluid flow through the heat exchanger.

11 Claims, 7 Drawing Sheets

(56) References Cited

U.S. PATENT DOCUMENTS

| | | | |
|---|---|---|---|
| 5,721,804 A * | 2/1998 | Greene, III | 392/358 |
| 5,761,908 A | 6/1998 | Oas et al. | |
| 5,993,501 A * | 11/1999 | Cusick et al. | 55/486 |
| 6,792,938 B2 * | 9/2004 | Komano et al. | 126/597 |
| 7,431,021 B1 | 10/2008 | Achor | |
| 8,375,936 B2 * | 2/2013 | Albritton | 126/647 |
| 2005/0139692 A1 * | 6/2005 | Yamamoto | 237/75 |
| 2005/0193812 A1 | 9/2005 | Ice | |
| 2006/0117769 A1 | 6/2006 | Helt et al. | |
| 2006/0118163 A1 * | 6/2006 | Plaisted et al. | 136/251 |
| 2007/0022770 A1 | 2/2007 | Liu | |
| 2008/0176503 A1 * | 7/2008 | Stanimirovic | 454/229 |
| 2008/0184991 A1 | 8/2008 | Krupp | |
| 2008/0202138 A1 | 8/2008 | Pabisz et al. | |

* cited by examiner

ENERGY TRANSFER MODULE UTILIZING THERMAL POWER GENERATED BY SOLAR PANELS

CROSS-REFERENCES TO RELATED APPLICATIONS

This application claims priority to U.S. Provisional Patent Application No. 61/263,798, filed Nov. 23, 2009, entitled "AN ENERGY TRANSFER MODULE UTILIZING THERMAL POWER GENERATED BY SOLAR PANELS", commonly assigned and incorporated by reference herein for all purposes.

BACKGROUND OF THE INVENTION

The present invention relates to an energy transfer technique. More particularly, the present invention provides a module and system for delivering solar panel generated thermal energy to a home in the form of home heating and/or hot water supply. Merely, by way of example, the present invention has been applied to demonstrate performance of an energy transfer module coupled with an air plenum structure associated with a solar array on the roof, but it would be recognized that the invention has a much broader range of applications.

Over the past centuries, the world population of human beings has exploded. Along with the population, demand for resources has also grown explosively. Such resources include raw materials such as wood, iron, and copper and energy, such as fossil fuels, including coal and oil. Industrial countries world wide project more increases in oil consumption for transportation and heating purposes, especially from developing nations such as China and India. Obviously, our daily lives depend, for the most part, upon oil or other fossil fuels, which are being depleted and becoming increasingly scarce.

Along with the depletion of our fossil fuel resources, our planet has experienced a global warming phenomena, known as "global warming," which was brought to our foremost attention by Al Gore, who is the former Vice President of the United States of America. Global warming is known as an increase in the average temperature of the Earth's air near its surface, which is projected to continue to increase at a rapid pace. Warming is believed to be caused by greenhouse gases, which are derived, in part, from use of fossil fuels. The increase in temperature is expected to cause extreme weather conditions and a drastic size reduction of the polar ice caps, which in turn will lead to higher sea levels and an increase in the rate of warming. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For most living beings on the Earth, sunlight has been essential. Likewise, the sun has been our most important energy source and fuel for modern day solar energy. Solar energy possesses many characteristics that are very desirable! Solar energy is renewable, clean, abundant, and often readily available.

As an example, solar panels have been developed to convert sunlight into energy. As merely an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successful for certain applications, there are still certain limitations. Typical solar panels are just used to convert sunlight into electricity while let all thermal energy generated (passively) wasted. To some degrees, the extra thermal energy (under the solar panels) may cause performance degradation of the PV cells and cause high roof temperature. Depending upon the geographic regions, the drawbacks mentioned above may contribute to be part of a big hurdle for installing relative costly solar panels to compete with the direct purchase of electricity from public power companies. These and other limitations are described throughout the present specification, and may be described in more detail below.

From the above, it is seen that an improved technique of effectively utilizing the thermal energy generated by the solar panels for a building is highly desired.

BRIEF SUMMARY OF THE INVENTION

The present invention relates to an energy transfer technique. More particularly, the present invention provides a module and system for delivering solar panel generated thermal energy to a home in the form of home heating and/or hot water supply. Merely, by way of example, the present invention has been applied to demonstrate thermal energy utilization of an energy transfer module coupled with an air plenum structure associated with a solar array on the roof, but it would be recognized that the invention has a much broader range of applications.

In a specific embodiment, the present invention provides an energy transfer module coupled to a thermal solar module. The energy transfer module includes a body including a first end member, a second end member, and four side members configured to enclose a first spatial region within a vicinity of the first end member and a second spatial region within a vicinity of the second end member. The first spatial region is in communication with the second spatial region. The energy transfer module further includes one or more inlet openings provided at the first end member for inputting fluid flow from the thermal solar module and an air filter disposed within the first spatial region to remove one or more impurities from the fluid flow. Additionally, the energy transfer module includes a fan disposed between the first spatial region and the second spatial region to draw the fluid flow through the air filter. The fan is coupled to a drive motor. The energy transfer module further includes a heat exchanger disposed in the first spatial region and an outlet provided on the second end member. Furthermore, the energy transfer module includes an electrical source coupled to the fan, the electrical source being configured to power the drive motor to draw fluid flow through the heat exchanger.

In an alternative embodiment, a system for delivering thermal energy generated by a solar panel for a building structure is provided by the present invention. The system includes an air plenum associated with the solar panel mounted over a roof of the building structure. Additionally, the system includes an energy transfer module comprising one or more air inlets, a heat exchanger, a motor blower, an electrical box, and at least an air outlet. Each of the one or more air inlets connects the air plenum via an insulated flexible duct. The motor blower is configured to draw air heated in the air plenum through the heat exchanger. The air outlet is coupled to a powered damper which is ducted to either a conditioned space or an outside exhaust. The system further includes a first water line connected from a water tank to the heat exchanger to supply cold water and a second water line connected from the heat exchanger to the water tank to deliver hot water. Furthermore, the system includes a controller coupled to the energy transfer module through the electrical box including a high-voltage power supply ranging from 30 VAC to 120 VAC and a low-voltage control voltage supply less than 30 VAC or 1-10 VDC.

In another alternative embodiment, the present invention provides an energy transfer module. The module includes a shaped casing body assembled from a plurality of side members. At least one of the plurality of side members includes two or more air inlets and at least another one of the plurality of side members includes an air outlet. The air inlets are configured to couple to a heating source for receiving an airflow. Additionally, the module includes an air handling unit attached to part of one or more of the plurality of side members between the two or more air inlets and the air outlet and configured to be slid at least partially out of the shaped casing body. The air handling unit includes a heat exchanger, a fan, and an electrical box. Furthermore, the module includes a controller coupled to the electrical box to drive the fan for drawing the airflow through the heat exchanger from the two or more air inlets to the air outlet.

Many benefits are achieved by way of the present invention over conventional techniques. For example, the present technique provides an easy to use process that relies upon conventional technologies such as thin film photovoltaic modules, which can be configured as a thermal solar device. Additionally, the present method provides a process that is compatible with the conventional photovoltaic module without substantial modifications to equipment and processes. Preferably, the invention provides for an improved solar module operation procedure, which is less costly and easy to handle, and has both electrical and thermal energy generation and utilization. In a specific embodiment, the present method and system provides for control of photovoltaic and thermal solar operation. Depending upon the embodiment, thermal energy in the form of heat can be used to improve efficiency of the thin film photovoltaic cell according to an embodiment of the present invention. In other embodiments, the present invention provides a method and structure having an improved efficiency per area of at least 10 percent and greater or 25 percent and greater using a thin film photovoltaic absorber depending upon the application. In a specific embodiment, the present improved efficiency is for a thin film based photovoltaic material, which traditionally has lower efficiencies. In a preferred embodiment, the overall energy conversion efficiency of the thermal solar system, including both thermal solar module and photovoltaic device using a thin film photovoltaic material, can be greater than about 30 percent. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention relates to an energy transfer technique. More particularly, the present invention provides a module and system for delivering solar panel generated thermal energy to a home in the form of home heating and/or hot water supply. Merely, by way of example, the present invention has been applied to demonstrate thermal energy utilization of an energy transfer module coupled with an air plenum structure associated with a solar array on the roof, but it would be recognized that the invention has a much broader range of applications.

Figure 1:
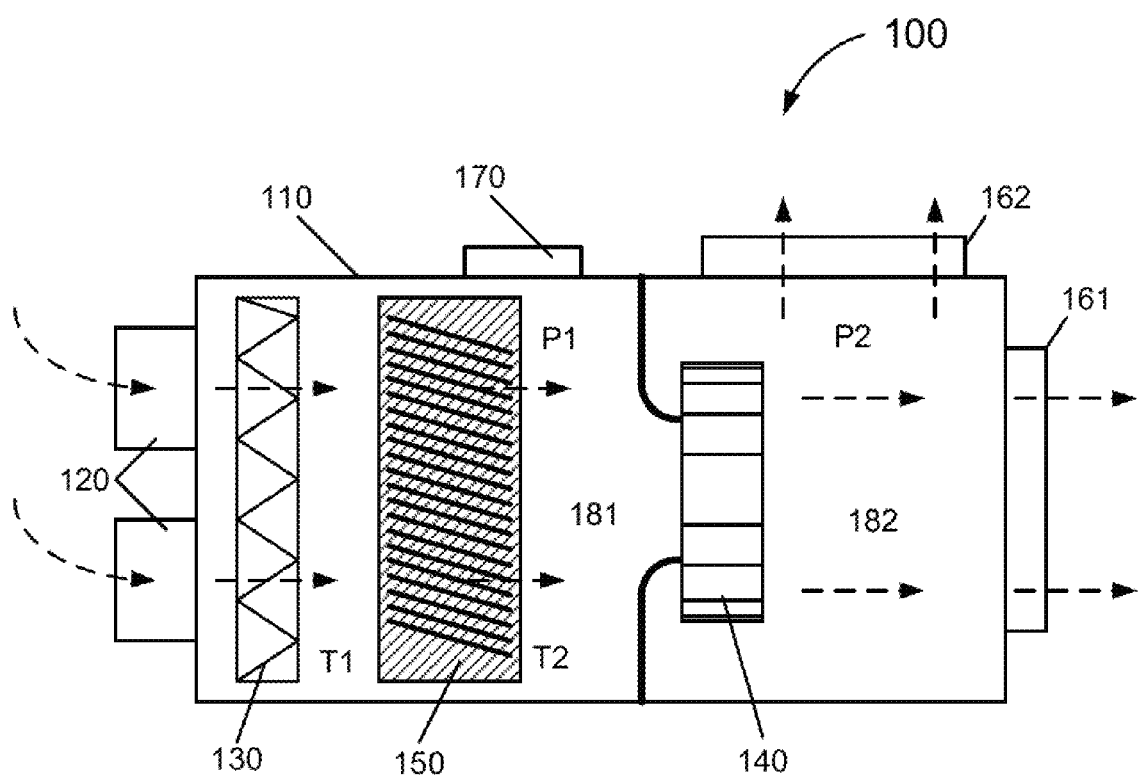
FIG. 1 is a simplified diagram of an energy transfer module coupled to a solar panel according to an embodiment of the present invention.

FIG. 1 is a simplified diagram of an energy transfer module coupled to a solar panel according to an embodiment of the present invention. This diagram is merely an example, which should not unduly limit the scope of the claims herein. One of ordinary skill in the art would recognize other variations, modifications, and alternatives. As shown, the energy transfer module (ETM) 100 is an apparatus for delivering thermal energy to a home/building coupled to a thermal solar module. The thermal solar module can include a solar panel (not shown) made from an array of photovoltaic (PV) cells and installed on a roof of the home/building. In certain embodiments, the solar panel can be any commercially available PV panel or thermal solar panel connected to the roof using a unique CleanLine™ mounting system provided by PVT Solar Inc. This mounting system creates an air plenum structure underneath the solar panel. The air plenum structure can hold a volume of air from ambient environment through an entrance. The volume of air forms, when heated, an airflow moving upward along the roof and under the solar panel. When the solar panel is illuminated by the sun light, it generates not only electricity by converting photon to electric current but also extra heat during the process. The airflow thus can at least partially take the heat away from the solar panel, acting as a carrier of thermal energy. The energy transfer module 100 is intended to control the rate of the airflow from the air plenum to transfer thermal energy from the solar panel to the air and further deliver the otherwise wasted thermal energy to the home/building in the form of home heating and/or hot water.

In an embodiment, the energy transfer module 100 includes an enclosing shell body 110 which is assembled from a first end member, a second end member, and four side members. Each of the shell body members can be a sheet metal made of 20 gauge galvanized steel with a thickness of about 0.032 inches. FIG. 1 shows a cross-sectional view of the shell body 110 of the energy transfer module 100 with the first end member at the left and the second end member at the right. The first end member is structured to include one or more inlet openings 120 while the second end member is structured to include one outlet opening 161. In a specific embodiment, each of the one or more inlet openings 120 has a 5 inch diameter collar for facilitating connection with an insulation flexible duct (not shown) which is directly linked to an exit region of the air plenum structure associated with one column of solar arrays. The air plenum structure contains a spatial region for a volume of air fluid which, as heated in the air plenum structure, can be guided into the energy transfer module 100 through the flexible duct and each of the plurality of inlet openings 120, as indicated by the arrows with dashed line. In another specific embodiment, a side member can include another outlet opening 162 that has substantially the same structure as the outlet opening 161. Each outlet opening 161 or 162 is configured to have a 10-inch diameter collar for facilitating connection to a power-controlled damper that can be field installed. The power-controlled damper can be adjusted to a partially open or close position to either allow the airflow to be guided through a duct to the designated conditioning space or to exhaust outside.

Referring to FIG. 1 again, the energy transfer module 100 also includes an air filter 130 disposed near the frond end member following the one or more inlet openings 120. In an embodiment, the air filter 130 is a 2-inch pleated air filter. In an example, a 2-inch thick pleated MERV 7 air filter is used, which provides air filtration rates up to 900 CFM, significantly higher than typical air filter for home furnace. The airflow, after passing the air filter 130, continues to be drawn by a motorized blower (or a fan with a drive motor) 140 disposed near the middle section of the body 110. The motorized blower 140 physically divides internal volume of space into a first spatial region 181 in the up stream for flowing air and a second spatial region 182 in the down stream. The motorized blower 140 includes a backward curved impeller, when it is rotated, to confine the airflow being pumped by accelerating the air outwards from the center of rotation. The air velocity achieved by the impeller transfers into pressure when the outward movement of the fluid is confined by a casing of the motorized blower. Along the backward curved impeller a difference in static pressure can be generated. A first static pressure P1 before the impeller is measured within the first spatial region 181. A second static pressure P2 after the motor impeller is measured within the second spatial region 182. P1 can be substantially greater than P2 so that the airflow is drawn in the direction as indicated by those arrows from the one or more inlet collars 120, through the air filter 130, to the outlet opening 161 at the second end member. The velocity of the airflow before the motorized blower is low and is increased after the backward curved impeller.

In an embodiment, an heat exchanger 150 is disposed within the first spatial region 181 for additionally utilizing the thermal energy carried by the heated air flow. The heat exchanger 150 is a coil with two rows of aluminum finned copper tubing. The copper tubing includes an inlet for connecting to a water pipe to receive running water and an outlet for delivering the water away through another water pipe. In an example, the copper tubing is a tube with ½-inch diameter. A first water line and a second water line respectively connect between the heat exchanger and a water tank (not shown). The heat exchanger 150 extracts the thermal energy from the airflow passed by and transfers the heat to the running water within the tubing, thereby transforming the water to hot water. The second water line carries the hot water back to the water tank for any home use.

In a specific embodiment, the air temperature before reaching the heat exchanger 150 is measured to be a first temperature T1 by a temperature sensor (not explicitly shown). After passing across the heat exchanger 150 to transfer heat partially to water running within the tubing, the air temperature drops to a second temperature T2, measured by another temperature sensor. In a specific embodiment, the second temperature T2 may be still substantially higher than ambient temperature so that the air can be used for home heating. Following the airflow path, the motorized blower 140 with a powerful, efficient backward curved impeller further can modulate the airflow from 30 to 100% of a flow rate as required.

In another specific embodiment, the airflow modulation is guided under a controller (not shown in FIG. 1) to provide power-modulation for the drive motor of the fan to adjust impeller rotation speed based on a temperature load of the energy transfer module. Specifically, the temperature load is a general temperature profile associated with the air temperature along the flow path and source temperature of the heat exchange medium. In an implementation, the temperature load is characterized by the first temperature T1, the second temperature T2, and a third temperature of the water in the water tank. The water tank supplies running water for the heat exchanger 150. Each of these temperatures can be measured by one of a plurality of temperature sensors. Furthermore under the guidance of the controller, the energy transfer module 100 can deliver the airflow with a desired temperature for home heating. In particular, the controller can send a control signal to open the power-controlled damper mounted with the outlet 161 at the second end member but close the other motorized damper mounted with the outlet 162 at a side member. In case the heat is not required, the airflow can be guided to the outside of the building, the controller just sends a control signal to reverse the above operation of the power-controlled dampers.

Figure 2:
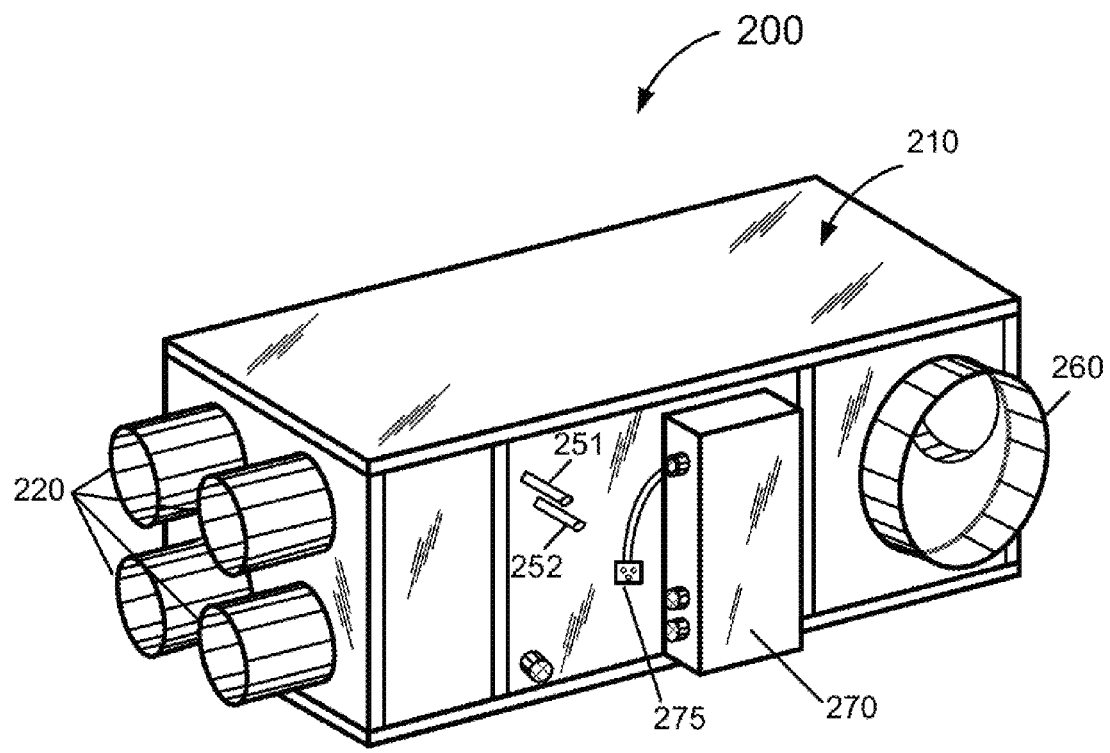
FIG. 2 is a simplified perspective view of the energy transfer module with an enclosing body according to an embodiment of the present invention.

FIG. 2 is a simplified perspective view of the energy transfer module with an enclosing body according to an embodiment of the present invention. This diagram is merely an example, which should not unduly limit the scope of the claims herein. One of ordinary skill in the art would recognize other variations, modifications, and alternatives. As shown in FIG. 2, an energy transfer module 200 has a rectangular shaped body 210 including two end members and four side members. The side members are attached with either of the two end members with no less than 4 sheet metal screws. On first end member (to the left) four inlet openings 220 are provided for respectively connecting to a flexible duct to guide an airflow into the energy transfer module 200. In an example, the energy transfer module 200 is the same as the energy transfer module 100 to include a filter, a heat exchanger, and a motorized blower within an enclosed volume of the body 210. In addition, the airflow passing over a spatial region having a hot surface carries certain amount of thermal energy into the energy transfer module 200 where the thermal energy is processed and utilized as required.

FIG. 2 also shows an outlet 260 provided on a side member near a second end member. The outlet 260 has a collar with a bigger diameter than that of the inlet collar. In an embodiment, the bigger diameter collar is for facilitating a connection of the collar to a power-controlled damper to adjust its open/close position. Another outlet opening on the second end member is barely visible through the outlet 260 and is substantially similar to the outlet 260. In an embodiment, the outlet 260 on the side member connects to a duct that guides the airflow to an exhaust to outside the building. In another embodiment, the outlet on the second end member connects to a duct that leads the airflow to a conditioning space of the building. Depending on the heating requirement, the power controlled damper associated with a specific outlet can be either in an open or close position to meet that requirement.

Referring to FIG. 2 again, an electrical box 270 is attached on a side member of the body 210 using 4 sheet metal screws. A three prong high-voltage power cord 275 is pre-wired with the electrical box 270 for plugging in a controller. Aluminum ground lug is fastened with a bolt, two star washers, and a matching nut for high voltage input into the energy transfer module 200 through the electrical box 270. In another specific embodiment, an inlet port 251 and an outlet port 252 are mounted on a side member of the body 210. The inlet port 251 is configured to connect a first water line (not explicitly shown) from the heat exchanger (not visible in this figure) inside the energy transfer module 200 for supplying (cold) water. The outlet port 252 is configured to deliver water out through a second water line (not shown). The water becomes hot after taking heat from the heated airflow through the heat exchanger and can be utilized for many applications such as building hot water supply, pool heating, and others. Of course, there can be many variations, alternatives, and modifications.

Figure 3:
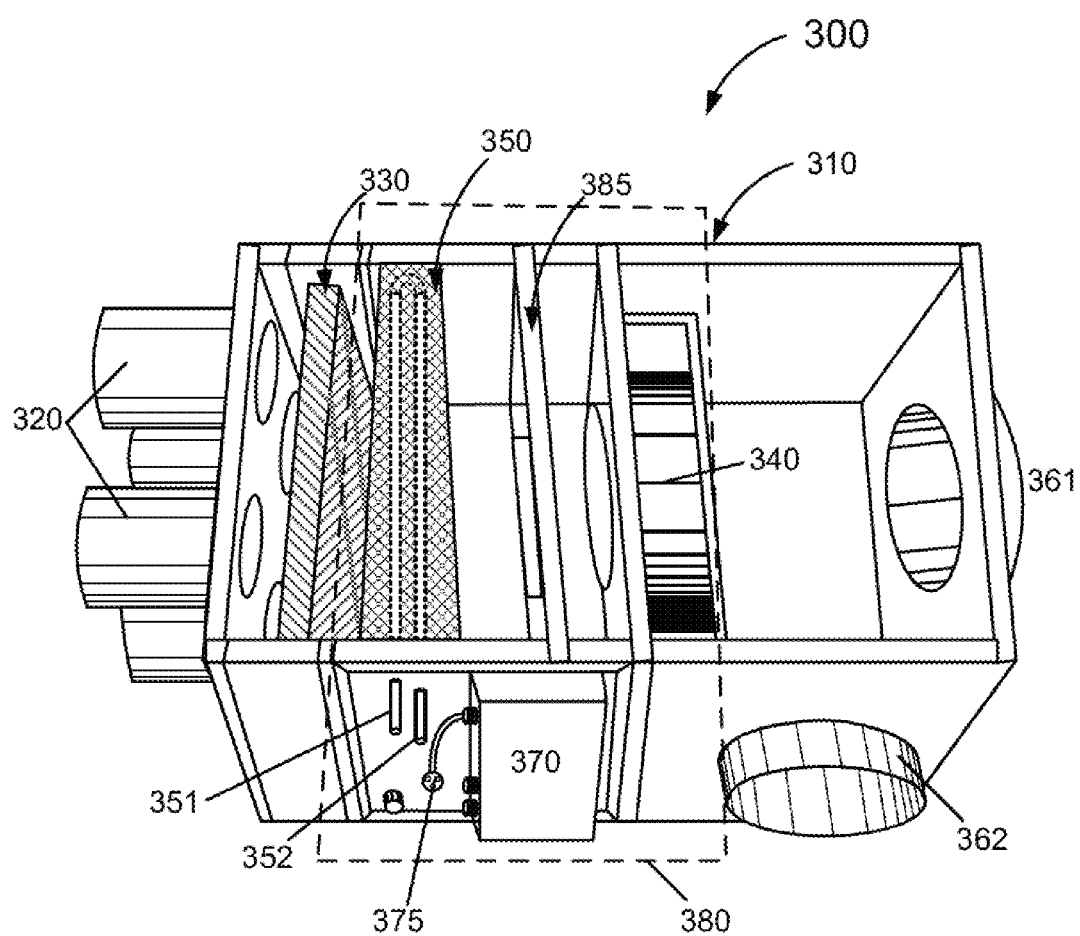
FIG. 3 is a simplified perspective view of the energy transfer module including an air handling unit in the body with one side member removed according to an embodiment of the present invention.

FIG. 3 is a simplified perspective view of the energy transfer module with one side member opened according to an embodiment of the present invention. This diagram is merely an example, which should not unduly limit the scope of the claims herein. One of ordinary skill in the art would recognize other variations, modifications, and alternatives. As shown, an energy transfer module 300 has a partial opened body 310 assembled from several sheet casement pieces. Within the body 310 and within a vicinity of a first end body piece with several inlet collars 320, a filter 330 is held in place using two brackets respectively mounted to two side body pieces. In an example, four inlet collars are respectively coupled to four flexible ducts that connect to four separate exit regions of four air plenum structures. Each air plenum structure can be associated with a column of solar array.

Also visible in this opened case 310, a heat exchanger 350 is disposed a distance away after the filter 330. In an embodiment, the heat exchanger 350 includes two rows of copper tubing respectively terminated with an inlet end 351 and an outlet end 352. Furthermore, a fan 340 is mounted by gauge brackets using suspension bolts. The fan includes a backward curved impeller relative to the incoming airflow from the air inlets 320. Therefore, the fan is driven by a motor, when powered on, to draw the airflow with a controlled flow rate from the inlet through the air filter 330 and the heat exchanger 350. The airflow further passes through the impeller and towards an air outlet 361 on a second end body piece or another air outlet 362 on a side body piece of the body 310. In an embodiment, the controlled airflow rate handled by the fan 340 is guided by a controller (not directly shown) plugged in an electrical box 370 through a 3-prong power cord 375. The electrical box 370 is attached to the outside of a side body piece of the body 310. The controller couples to a high-voltage power supply for delivering 30 VAC to 120 VAC voltage power to drive the fan with a range of 30 to 100% modulation of the flow rate. The controller also is able to send control signal to adjust or guide the airflow by controlling one or more motorized dampers mounted on the air outlet 361 or 362. Of course, there can be many variations, modifications, and alternatives.

In an alternative embodiment, the energy transfer module includes an air handling unit that is configured to be slid out of the body from one side after removing the side member first. In FIG. 3, an air handling unit 380 (enclosed by the dashed lines) is fitted within the body 310 of the energy transfer module 300. In a specific embodiment, the air handling unit 380 includes the heat exchanger 350 and the fan 340 disposed inside the body 310. The air handling unit 380 also includes the electrical box 370 electrically coupled to a drive motor for controlling the fan 340. The electrical box 370 is mounted on a piece of sheet metal which is provided as part of the side member. The heat exchanger 350 has an inlet port 351 and an outlet port 352 mounted through the same piece of sheet metal. Additionally the air handling unit 380 has a handle bracket 385 mounted across two side members of the body 310, which is installed for the convenience of pulling the air handling unit 380 out of the body 310.

Figure 3A:
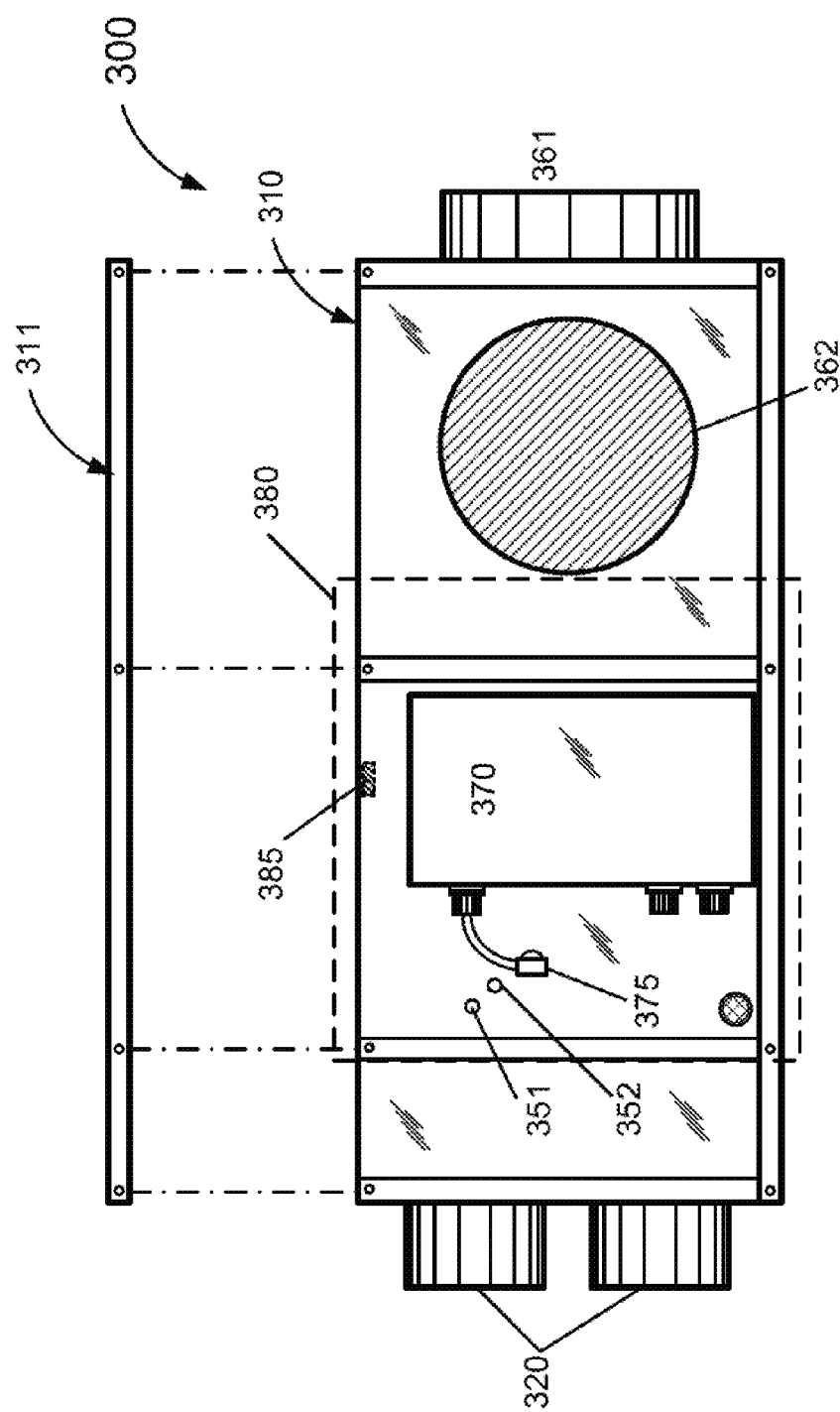
FIG. 3A is a side view of the energy transfer module with the side member separated from the body according to an embodiment of the present invention.
Figure 3B:
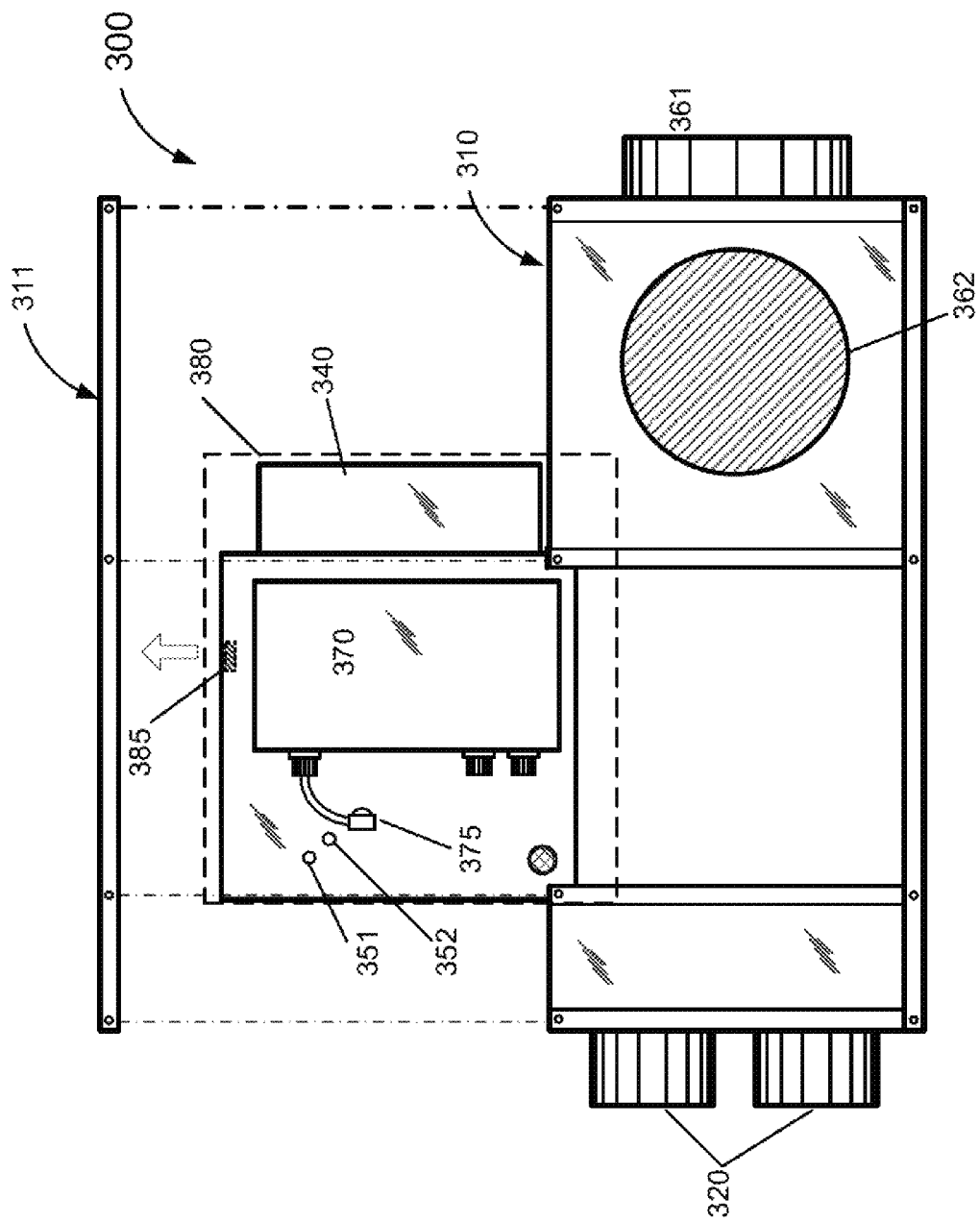
FIG. 3B is another side view of the energy transfer module with the air handling unit partially sliding out of the body according to an embodiment of the present invention.

The feature of sliding out the air handling unit from the body provides advantages for the module maintenance. FIGS. 3A and 3B show further detail of the features of the ETM shown in FIG. 3. FIG. 3A shows a side view of the energy transfer module 300 with the side body member 311 separated from the body 310 according to an embodiment of the present invention. In this view, the air handling unit 380 is still fit in the body 310 with the handle bracket 385, denoted by dashed line for illustration purpose, behind the side sheet metal for mounting the electrical box 370. Other parts including the heat exchanger and the fan are not explicitly visible. FIG. 3B shows another side view of the energy transfer module 300 with the air handling unit 380 partially sliding out of the body 310 according to an embodiment of the present invention. In this view, the air handling unit 380 has been partially pulled out via the handle bracket 385 along the direction indicated by the arrow. A casing for holding the fan 340 is now partially revealed. This feature allows easy access to the heat exchanger (which is behind the side sheet metal and not visible in this viewing angle) and the fan. Any repair work or routing maintenance work can be easily performed by a service personal or user. Of course, there are many variations, modifications, and alternatives.

Figure 4:
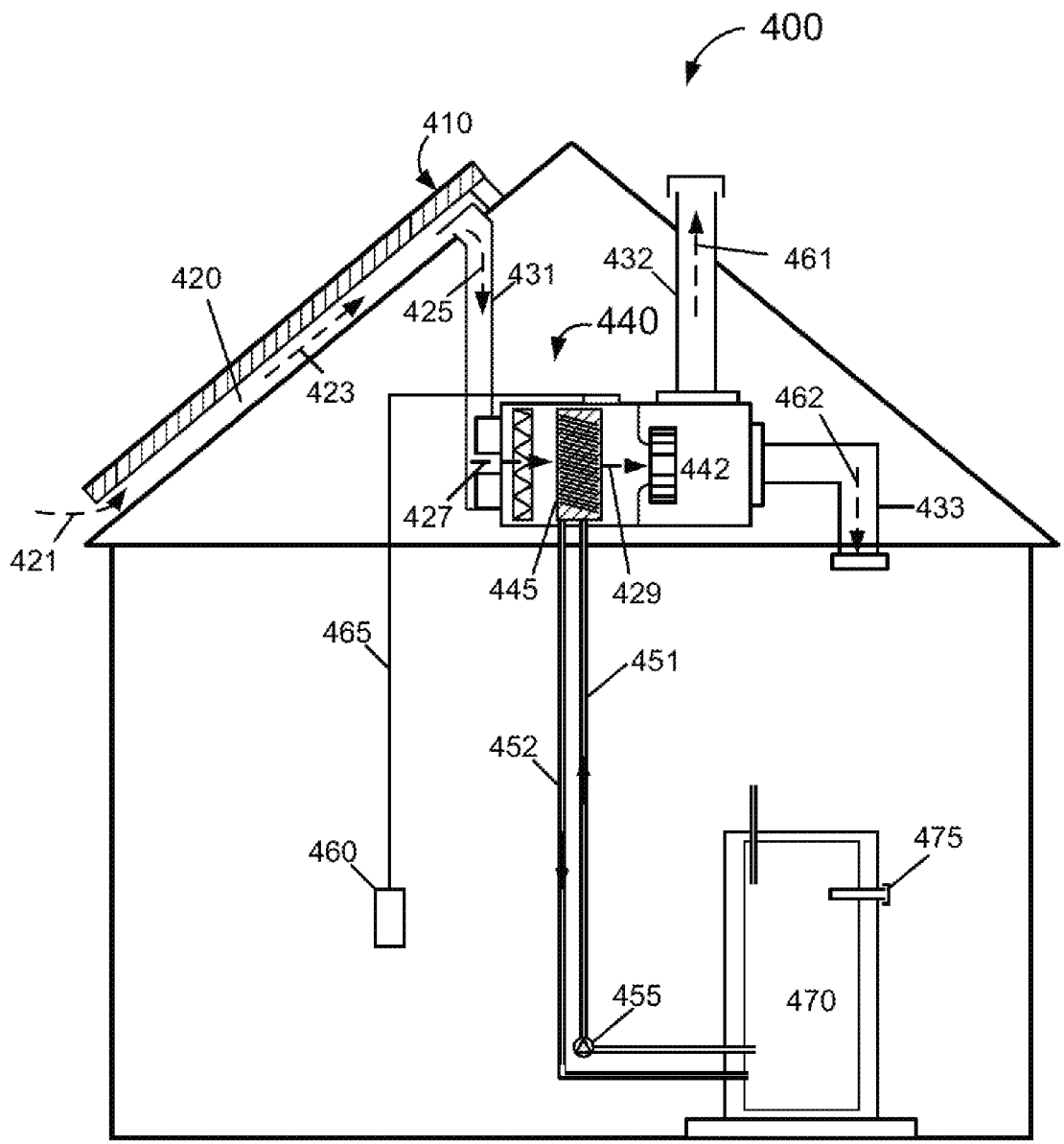
FIG. 4 is a simplified diagram of a system for utilizing thermal energy generated a by solar panel for home heating and hot water supply according to an embodiment of the present invention.

FIG. 4 is a schematic diagram of a system for utilizing thermal energy generated a by solar panel for home heating and hot water supply according to an embodiment of the present invention. This diagram is merely an example, which should not unduly limit the scope of the claims herein. One of ordinary skill in the art would recognize other variations, modifications, and alternatives. As shown, a system 400 is a building solar energy utilization and supply system. On an angled roof of the building, a solar panel 410 is installed. In particular, the solar panel is mounted using a rack fixture structured to form an air plenum 420 between a bottom surface of the solar panel 410 and a top surface of the roof. The air plenum 420 has an entrance region directly linked to ambient and an exit region connected by a flexible duct 431. The system 400 is configured to draw airflow 421 from ambient into the air plenum 420 to be heated by the solar panel 410 under the sun. The airflow 423 becomes a moving fluidic medium carrying thermal energy released from the solar panel 410. Of course, there are many variations, modifications, and alternatives. For example, the solar panel 410 can be any combination of a photovoltaic cell, a thermal pad, a heat-generating panel, an insulated glass assembly, a solar absorbing device, and the like. In this specification, "solar panel" is used as merely one example for application associated with solar energy utilization for building. But the claims herein should not limits its scope to that, broader applications should be generally applied to handling airflow carrying heat generated by devices in any means and thermal energy utilization using the energy transfer module according to the present invention.

In an embodiment, the system 400 includes an energy transfer module 440 configured to process the fluidic medium, i.e., the airflow, to utilize the thermal energy it carries with a much improved efficiency. In an example, the energy transfer module 440 is substantially the same as the energy transfer module 100 described earlier. In an embodiment, the energy transfer module 440 uses a fan 442 driven by a motor through a controller 460 to draw and modulate the airflow to achieve an optimized energy harvest produced by the solar panel 410. The airflow 423 in air plenum 420 is heated and moves along a path as airflow 425 guided by the duct 431. It further is drawn into the energy transfer module 440 as airflow 427 through an inlet and an air filter. The energy transfer module 440 is configured to utilize the thermal energy carried by processing the airflow at least in two ways. A first way of energy utilization is to use a heat exchanger 445 to transfer heat carried by the airflow 428 to another fluid medium contained by the heat exchanger 445. For example, the fluid medium in the heat exchanger 445 is running water supplied by a first water line 451 by a pump 455 from a water tank 470. After the heat exchange, cold running water is heated and is returned back via a second water line 452 to the water tank 470. The water tank 470 serves a storage place of the hot water for any home usage. In an embodiment, the temperature of the water in the water tank serves a reference temperature for controlling the energy transfer process mentioned above. Alternatively, the water tank 470 also includes a conventional water heater so that the water may be heated using a backup gas/electric heater 475 for keeping the reference temperature at a desired level when no enough thermal energy being transferred through the heat exchanger. A second way of energy utilization is to direct supply the heated airflow through one or more outlets to regions as required. Either way of the energy transfer module operation mentioned above is guided by the controller 460 based on a temperature load including temperatures in the module before/after the heat exchanger and the reference temperature in the water tank.

In a specific embodiment, the controller 460 is configured to be plugged in via a pre-wired power cord from an electrical box attached with the energy transfer module 440. The controller 460 is further configured to receive a plurality of sensing information including a temperature load for the module, airflow velocity at the heat exchanger, static pressure variation across the motorized impeller. For example, for the first way of operation using heat exchange, the temperature load is used as input for the controller 460 to generate one or more control signals for adjusting the flow rate via the motorized impeller. In particular, the temperature load may be characterized by a first temperature associated with the airflow 427 before passing the heat exchanger, a second temperature associated with the airflow 429 after passing the heat exchanger, and a third temperature of the water from the water tank 470 used by the heat exchanger as a heat-exchange medium. In one embodiment, the first temperature of the air before passing the heat exchanger should be at least 10 degrees higher than the third temperature of the water. With the input of the temperature load information, the controller 460 can couple to a drive motor to set the fan with an optimum speed to maximize the overall energy utilization, i.e., using least power to achieve maximum thermal energy transfer.

In another specific embodiment, the controller 460 also is configured to send one or more control signals to adjust the motorized damper installed to the outlet collar. For example, the motorized damper for one outlet leading to conditioning space of the building can be closed if the building does not need heat. In this case, the motorized damper for another outlet leading to exhaust duct 432 can be opened to release the unwanted hot air 461 to outside ambient. If the building needs heating, the motorized damper for the corresponding outlet can be adjustably opened to send hot air 462 into the building through duct 433 as required.

Figure 5:
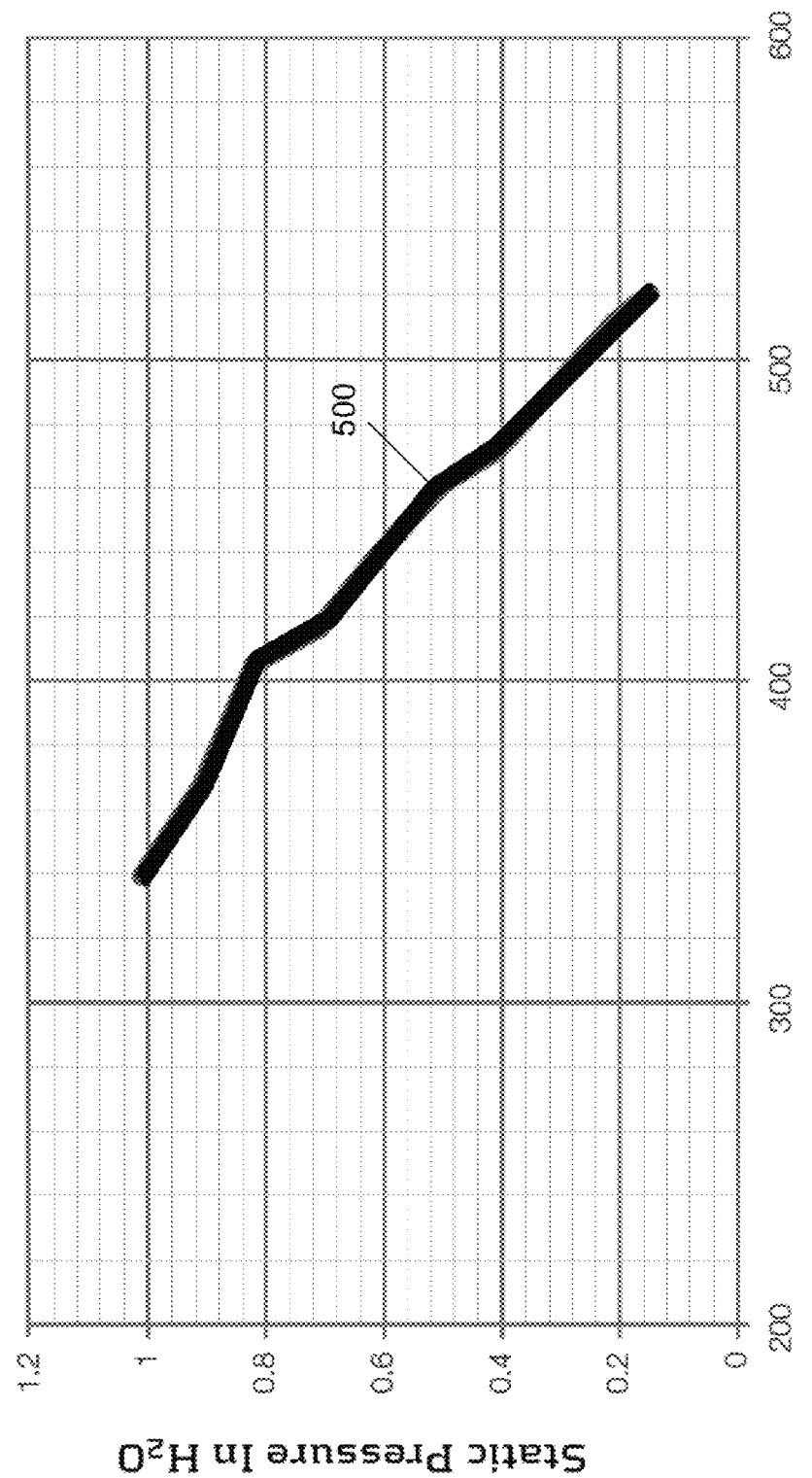
FIG. 5 is an exemplary plot of a controlled static pressure within the energy transfer module according to embodiments of the present invention.

The airflow control by the energy transfer module using a powerful, efficient motor to draw ambient air through the air plenum between the solar panels and the roof can be monitored in terms of static pressures. FIG. 5 is an exemplary plot of a controlled static pressure within the energy transfer module according to embodiments of the present invention. This diagram is merely an example, which should not unduly limit the scope of the claims herein. One of ordinary skill in the art would recognize other variations, modifications, and alternatives. As shown, a curve 500 is a plot of a plurality of static pressure values versus corresponding flow rates measured by sensors installed within an energy transfer module described the earlier part of the specification. The energy transfer module is part of a building energy utilization system. In particular, the building energy utilization system is designed for solar energy harvest, including a solar array installed on the roof of the building. Between a bottom surface of the solar array and the roof top surface, an air plenum structure encloses a volume of air from ambient. When sun light irradiates the solar array, sun energy partially is converted to electricity if PV cells are included in the solar array and partially is transformed as thermal energy released through its surface. The heat can be transferred to the air flown under the bottom surface of the solar array. The heated airflow thus is processed by the energy transfer module coupled to the air plenum structure using a motor blower with a controlled steady-state flow rate and the thermal energy carried by the airflow can be utilized accordingly. In FIG. 5 the motor blower is driven by a power supply with adjustable voltages. At any specific voltage supply a steady airflow within the energy transfer module can be achieved. The range of the voltage supply can vary so that the steady airflow can move in any rate from about 340 CFM to 520 CFM. Correspondingly, the range of the rate variation is about 30% to 100% of a designated rate value. The static pressure of the steady airflow at least partially depends on an internal structure of the guided path within the energy transfer module, especially the impeller curvature and the rotation speed of the impeller. Accordingly, the curve 500 in FIG. 5 shows that the static pressure handled by the energy transfer module can be in a range from 0.15 to 1.0 ft of $H_2O$ column. In an embodiment, the motor blower in the energy transfer module includes a continuous duty, permanently lubricated, backward curved impeller, which is capable of supplying a steady airflow over a range of static pressures from 0.1 to 1.50 ft of $H_2O$ column. Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An energy transfer module coupled to a thermal solar module, the energy transfer module comprising:

a body including a first end member, a second end member, and four side members configured to enclose a first spatial region within a vicinity of the first end member and a second spatial region within a vicinity of the second end member, the first spatial region being in communication with the second spatial region;

one or more inlet openings provided at the first end member for inputting fluid flow from the thermal solar module;

an air filter disposed within the first spatial region to remove one or more impurities from the fluid flow;

a fan disposed between the first spatial region and the second spatial region to draw the fluid flow through the air filter and a heat exchanger, the fan coupled to a drive motor;

the heat exchanger disposed in the first spatial region and having an inlet port and an outlet port coupled to a tank, wherein the tank contains a heat exchange medium configured to flow through the heat exchanger;

an outlet provided on the second end member;

a first temperature sensor disposed in front of the heat exchanger for measuring inlet air temperature, a second temperature sensor disposed behind the heat exchanger for measuring outlet air temperature, and a third temperature sensor for measuring a heat exchange medium temperature in the tank; and a controller coupled to the first temperature sensor, the second temperature sensor, and the third temperature sensor for determining information about energy transfer from the thermal solar module through the heat exchanger via the one or more outlet openings, wherein the controller to generates a control signal for driving the fan based on at least a temperature load, the temperature load including measurements from the first temperature sensor, the second temperature sensor, and the third temperature sensor.

2. The energy transfer module of claim 1 wherein each of the one or more inlet openings comprises a collar for coupling to an insulated flexible duct connected to the thermal solar module.

3. The energy transfer module of claim 1 wherein the fan comprises backward curved impellers with continuous duty to drive the airflow with a range of static pressures including an inlet pressure in the first spatial region and an outlet pressure in the second spatial region.

4. The energy transfer module of claim 3 wherein the range of static pressures is measured by 0.1 to 1.50 ft of $H_2O$ column.

5. The energy transfer module of claim 1 wherein the drive motor is disposed by a gauge mounting bracket coupled at least partially to the four side members.

6. The energy transfer module of claim 1 wherein the air filter comprises a two-inch thick pleated MERV 7 air filter with air filtration rate up to 900 CFM.

7. The energy transfer module of claim 1 wherein the heat exchanger comprises a coil made by two rows of aluminum finned copper tube for transferring heat carried by the fluid flow to water within the copper tube.

8. The energy transfer module of claim 7 wherein the copper tube comprises an entry port connected to a first water line to allow cold water being pumped from a water tank and an exit port connected to a second water line to output the heated water back to the water tank.

9. The energy transfer module of claim 1 wherein the outlet opening comprises a collar for coupling to a powered damper and ducting to either a conditioned space or an exhaust to outside.

10. The energy transfer module of claim 1 wherein the controller comprises a 30-120 VAC power supply for driving the motor with a modulated airflow from 30 to 100% of a predetermined rate.

11. The energy transfer module of claim 1 wherein the thermal solar module can be any combination of a photovoltaic panel, a thermal panel, an insulated glass panel, a heating pad.

* * * * *